June 28, 1932.     A. VIESER     1,864,966
GAS PRODUCER
Filed Jan. 11, 1930
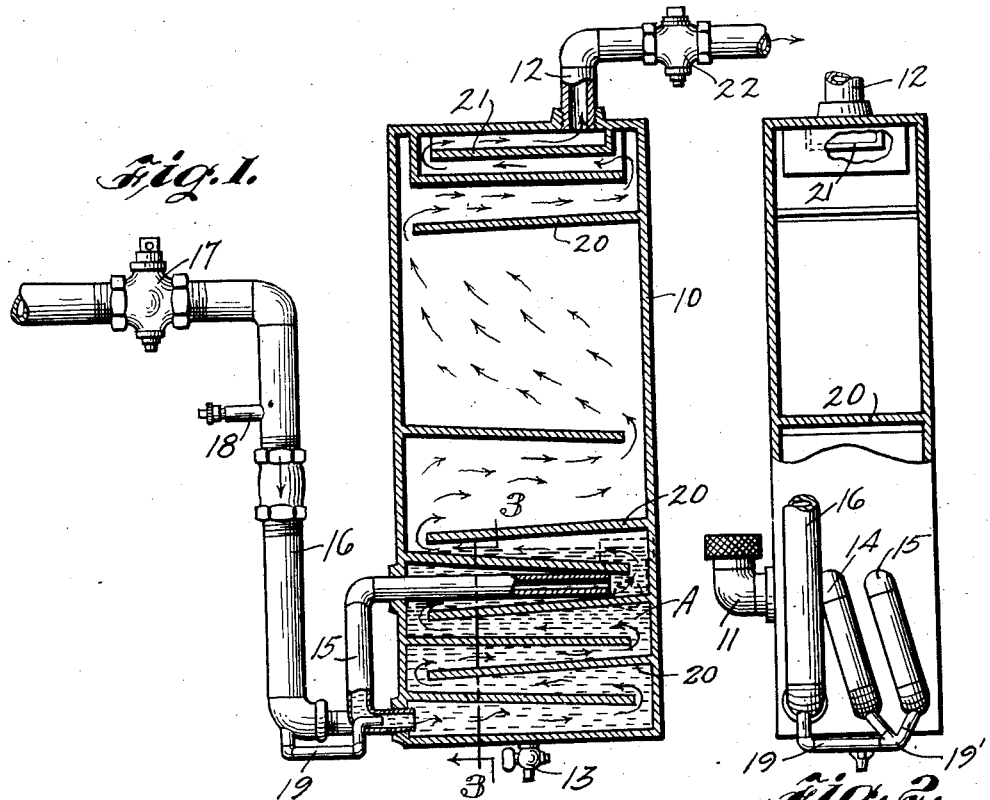
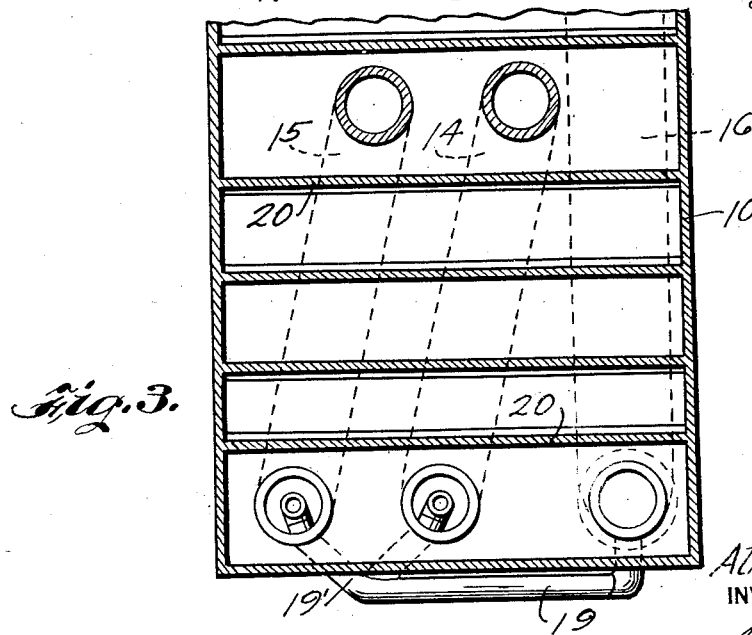
Albert Vieser, INVENTOR
BY Jack Ashley, ATTORNEY Patented June 28, 1932

1,864,966

UNITED STATES PATENT OFFICE

ALBERT VIESER, OF DALLAS, TEXAS

GAS PRODUCER

Application filed January 11, 1930. Serial No. 420,226.

This invention relates to new and useful improvements in gas producers.

One object of the invention is to provide an improved gas producer having means for thoroughly agitating a fuel liquid and mixing the same with air for producing a maximum quantity of fuel gas from said liquid.

Another object of the invention is to provide in a gas producer means for circulating air through a fuel liquid to form a combustible gas and also to utilize air to set up a circulation of the liquid and air, whereby the fuel liquid is robbed of its volatile constituents to a maximum degree and a more combustible mixture economically produced.

A further object of the invention is to provide circulating and agitation means including means for by-passing the fuel liquid from one elevation to another within the body of the liquid, together with means for introducing air under pressure into the liquid to cause it to by-pass, whereby the production of a highly combustible gaseous fuel is carried out.

A construction designed to carry out the invention will be hereinafter described together with other features of the invention.

The invention will be more readily understood from a reading of the following specification and by reference to the accompanying drawing in which an example of the invention is shown, and wherein:

Figure 1 is a sectional elevation of a device constructed in accordance with the invention.

Figure 2 is a view partly in section and partly in elevation taken from one end, and Figure 3 is an enlarged vertical sectional view taken on the line 3—3 of Figure 1.

In the drawing the numeral 10 designates a rectangular shaped container having an inlet pipe 11 at one side intermediate its ends and an outlet pipe 12 at its top. A draincock 13 is provided in the bottom of the container. A by-pass composed of conduits 14 and 15 each have an upper end opening into the container intermediate its ends and below the inlet 10 whereby said ends are immersed in a fuel liquid A within said container. The other ends of said conduits enter the container at its bottom, whereby the liquid may be by-passed from one elevation to another with the body of the liquid thereby providing for the circulation of said liquid.

The lower ends of the conduits 14 and 15 enter the container at an inclination to one side of the upper ends to provide for the spaced entrance at the bottom of the container of an air supply conductor 16. Said conductor may be connected with any suitable air pressure source and has a suitable cut-off valve 17 provided therein for regulating the flow of air therethrough. The conductor is provided with a nipple 18 for connection thereto of a suitable hand pump as an additional source of air supply.

A by-pass 19 connects the conductor with the conduits 14 and 15 for supplying forced air to the same. The by-pass 19 has a yoke end 19', each arm of which extends into one of the conduits 14 and 15 and is so positioned that air expelled therefrom will pass out of the lower end of said conduits into the bottom of the container. The air being expelled under pressure from the by-pass 19 into the conduits 14 and 15 will force out the liquid A within the ends of the conduits, thereby creating a vacuum in the same, which will cause the liquid to be drawn into the upper ends of the conduits, thus creating a circulation of said liquid.

A plurality of baffles 20 each having a slight downward inclination are disposed transversely of the container at the bottom portion thereof. Said baffles are so arranged as to provide for the circuitous passage of the liquid and the air around the alternate ends of the baffles. The downward inclination of the baffles 20 tends to retard the travel of the air thereunder, such air naturally seeking to rise from the liquid, thereby causing the two to commingle so thoroughly that the fuel liquid is robbed to a maximum degree of its volatile constituents in the form of a highly combustible gaseous fuel.

Obviously, such application of air under pressure to the fuel liquid provides for the production of a maximum degree of highly combustible gaseous fuel in an economical manner. This gaseous fuel will pass upward around baffles 20' above the liquid to the top of the container. The gas will pass over a series of trays 21 at the top of the container to the outlet 11. These trays together with the baffles above the liquid will scrub the gaseous fuel of any superfluous moisture or liquid, thereby providing a more highly combustible gaseous fuel. The flow of the gaseous fuel through the outlet pipe 11 may be regulated by a cut-off valve 22 provided in said pipe.

It is obvious that the space within the container above the liquid may be used as a gas reservoir and by enlarging such space the quantity of gas contained therein may be increased.

Various changes in the size and shape of the different parts, as well as modifications and alterations, may be made within the scope of the appended claims.

What I claim, is:

1. In a gas producer, a container having a liquid fuel chamber at its bottom, means having its upper end constantly immersed in the liquid in said chamber for by-passing a portion of said liquid from one elevation in said chamber to another elevation in said chamber, means for introducing air into said by-passing means to circulate a portion of the liquid, and means for introducing air into said chamber to agitate said liquid to form a gaseous mixture.

2. The combination set forth in claim 1, and means in the liquid chamber for baffling the flowing fluids.

3. In a gas producer, a container having an outlet near its top and a liquid fuel chamber at its bottom, means having its upper end constantly immersed in the liquid in said chamber for by-passing a portion of said liquid from one elevation in said chamber to another elevation in said chamber, means for introducing air into said by-passing means to circulate a portion of the liquid, means for introducing air into said chamber to agitate said liquid to form a gaseous mixture, and baffles inclined downwardly in the said chamber for retarding the flow of the air through the said chamber.

4. The combination set forth in claim 1, an outlet at the top of the container and means at the top of the container for forming a restricted passage for the gaseous mixture to pass through before entering the outlet.

5. In a gas producer, a container having an outlet near its top and a liquid fuel chamber at its bottom, means having its upper end constantly immersed in the liquid in said chamber for by-passing a portion of said liquid from one elevation in said chamber to another elevation in said chamber, means for introducing air into said by-passing means to circulate a portion of the liquid, baffles within the chamber to provide a circuitous passage for the circulating fluids, means for introducing air into said chamber to agitate said liquid to form a gaseous mixture, and means in said container for further baffling the gaseous mixture.

In testimony whereof I affix my signature.

ALBERT VIESER.